United States Patent [19]

Nakajima et al.

[11] 4,385,598

[45] May 31, 1983

[54] ENGINE SYSTEM

[75] Inventors: Yasuo Nakajima, Yokosuka; Michio Onoda, Yokohama; Kunihiko Sugihara, Ichigaya-takashomachi, all of Japan

[73] Assignee: Nissan Motor Company, Limited, Yokohama, Japan

[21] Appl. No.: 215,720

[22] Filed: Dec. 12, 1980

Related U.S. Application Data

[63] Continuation of Ser. No. 856,583, Dec. 1, 1977, abandoned.

[30] Foreign Application Priority Data

Dec. 2, 1976 [JP] Japan .................................. 51-145125
Dec. 20, 1976 [JP] Japan .................................. 51-153116

[51] Int. Cl.$^3$ .................... F02B 25/00; F02D 33/02
[52] U.S. Cl. ................................ 123/76; 123/432; 60/276
[58] Field of Search ............... 123/76, 308, 432, 568, 123/585, 587, 440; 60/276, 278

[56] References Cited

U.S. PATENT DOCUMENTS

| | | | |
|---|---|---|---|
| 2,818,931 | 5/1958 | Mallory | 180/54 |
| 2,940,432 | 6/1960 | Hijszeler | 123/76 |
| 3,046,961 | 7/1962 | Dolza | 123/76 |
| 3,092,089 | 6/1963 | Dolza | 123/76 |
| 3,738,109 | 6/1973 | Tatsutomi et al. | 123/587 |
| 3,744,464 | 7/1973 | Soltav | 123/587 |

FOREIGN PATENT DOCUMENTS

| | | | |
|---|---|---|---|
| 588748 | 12/1959 | Canada | 123/76 |
| 658891 | 6/1929 | France | 123/76 |
| 47-16581 | 5/1972 | Japan . | |
| 47-40207 | 10/1972 | Japan . | |

*Primary Examiner*—Craig R. Feinberg
*Assistant Examiner*—W. R. Wolfe
*Attorney, Agent, or Firm*—Schwartz, Jeffery, Schwaab, Mack, Blumenthal & Koch

[57] ABSTRACT

An engine system comprises an internal combustion engine and an exhaust gas treatment system, such as a three-way catalytic converter or an oxidation catalytic converter. The engine has an additional intake means, in addition to a main intake means for admitting by induction an air fuel mixture to a combustion chamber, for admitting under pressure above atmospheric pressure air to the combustion chambers during a period initiating during the exhaust stroke and terminating during the intake stroke for the purpose of expelling residual gas from the combustion chamber to bring about a stable combustion.

21 Claims, 10 Drawing Figures

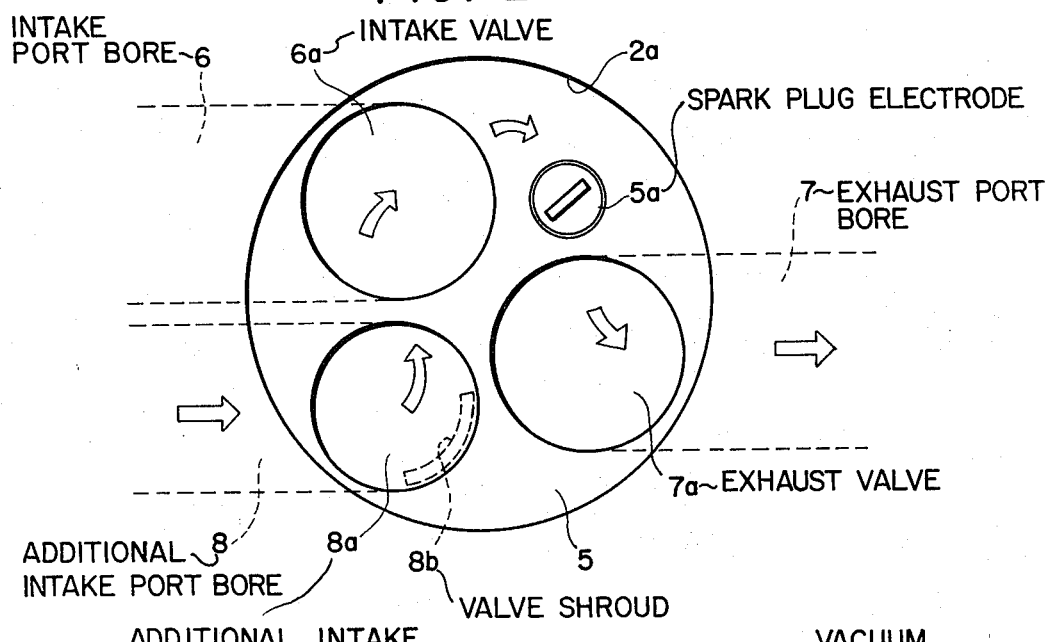
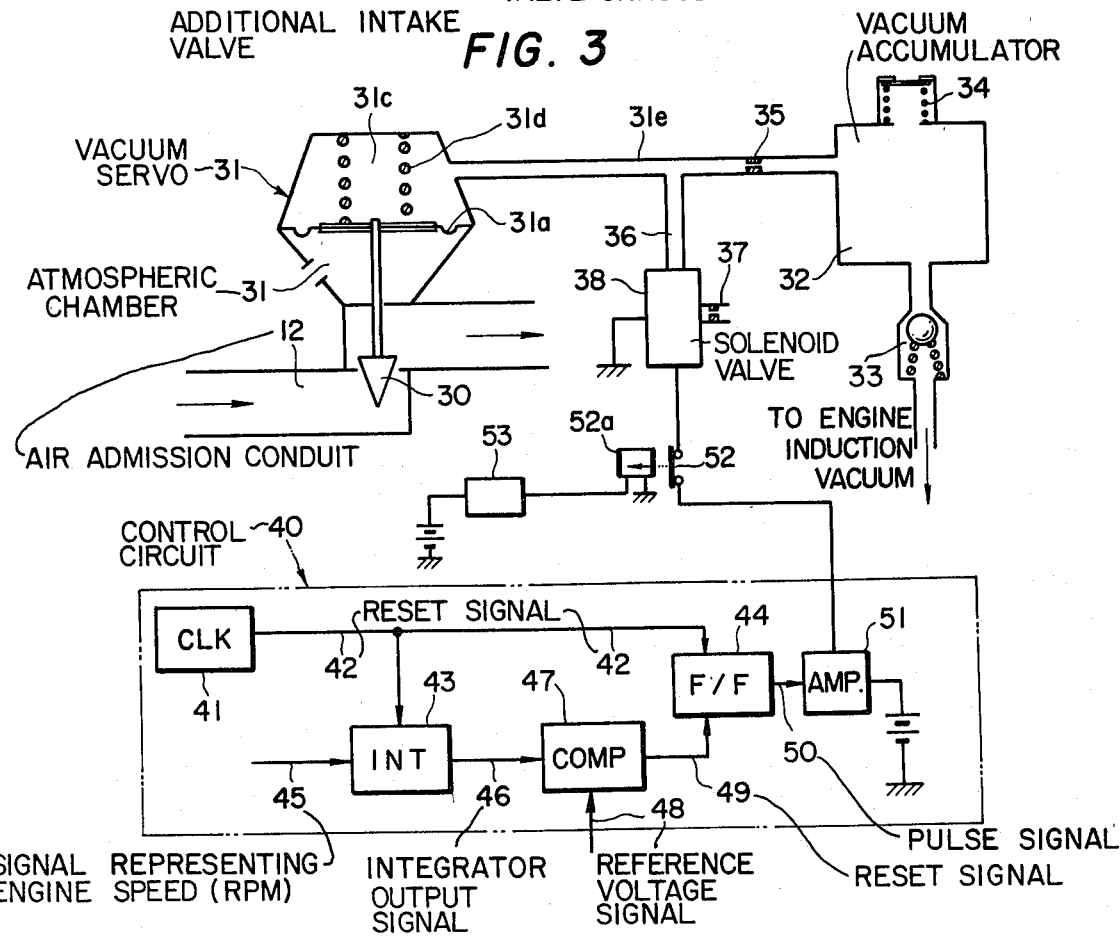

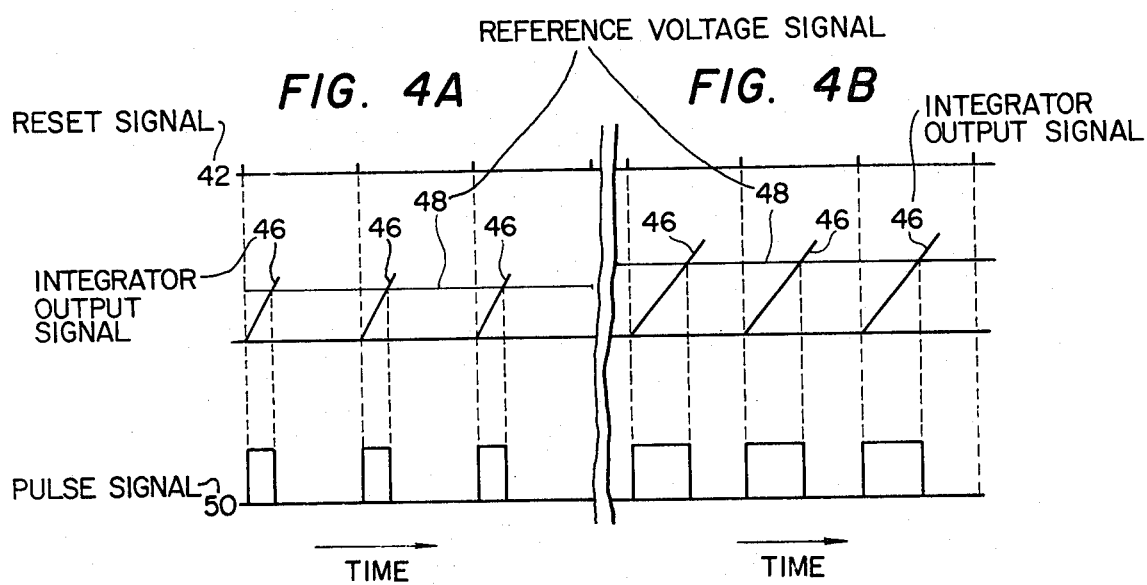
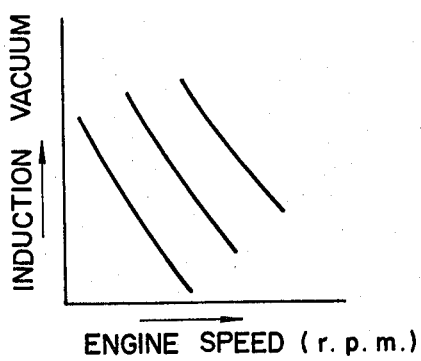

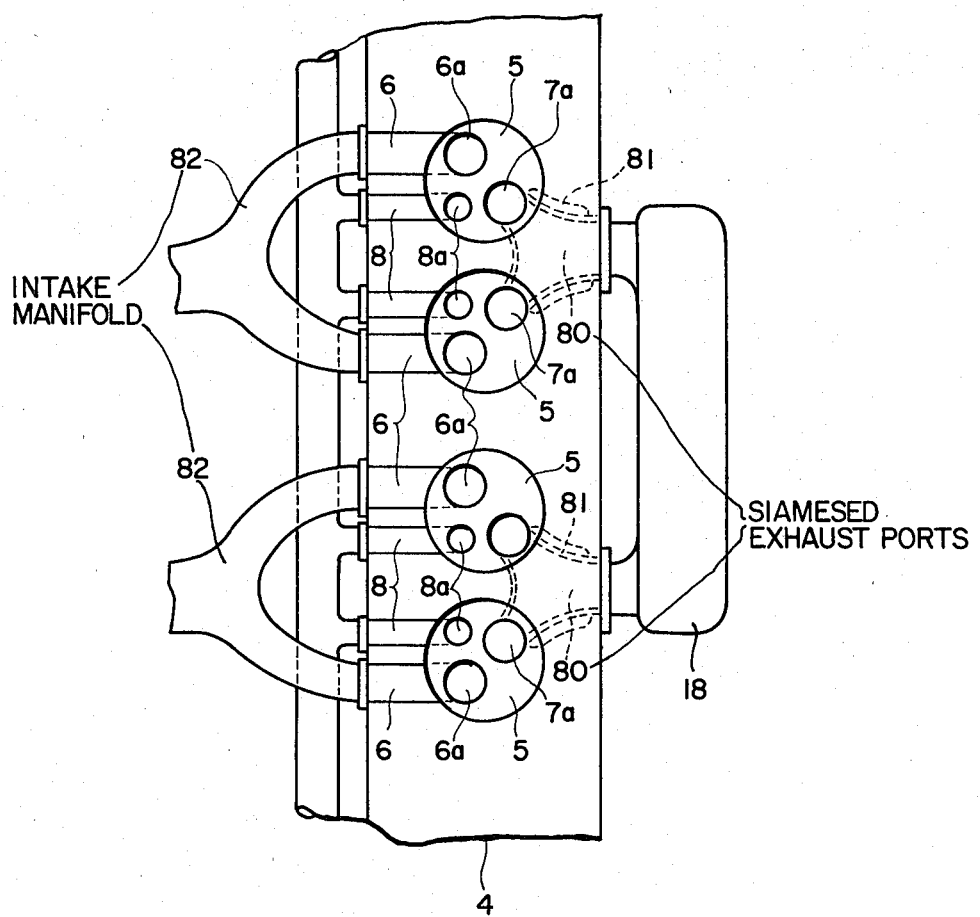

ENGINE SYSTEM

This is a continuation, of application Ser. No. 856,583, filed Dec. 1, 1977, now abandoned.

BACKGROUND OF THE INVENTION

The present invention relates to an engine system and more particularly to an engine system having an internal combustion engine and an exhaust gas treatment system.

An engine system is known which comprises a three-way catalytic converter in which engine exhaust gases flowing therethrough are exposed to a catalytic substance which, given the proper air-fuel ratio in the exhaust gases, will promote simultaneous oxidation of CO and HC and reduction of NOx. In such an engine system, because an air fuel mixture supplier is so controlled as to effect combustion at stoichiometry, fuel economy is poorer than an engine system in which lean combustion takes place. Moreover, the known engine system can not yield power output high enough to meet demand when high power output is required.

Another known engine system comprises an oxidation catalytic converter which has a catalytic substance which will promote oxidation of CO and HC. In such an engine system, because an air fuel mixture supplier is so controlled as to effect lean combustion, fuel consumption increases and power output decreases when the engine operates under light load conditions. These results are attributable to the fact that the ratio of residual gas to fresh air fuel mixture in a charge in a combustion chamber increases abruptly under these conditions bringing about rough combustion leading to rough engine operation.

SUMMARY OF THE INVENTION

It is an object of the invention to improve fuel economy and power output of an engine system having an internal combustion engine and an exhaust gas treatment system.

An engine system according to the invention results from the recognition that the so called engine stability is affected by G/F, rather than A/F, of a charge in a combustion chamber and there is a limit value in G/F above which the engine stability is not acceptable to ordinary use as a prime mover of an automobile, where, G=(intake air portion of the charge)+(residual gas portion of the charge). This means that if the residual gas portion of the charge could be replaced with the same amount of pure air, the same engine stability could be obtained with less fuel, resulting in low fuel consumption. This results from the fact that the pure air replacing the residual gas portion will help burning of fuel, while the residual gas of the charge, if not replaced, will make the burning of fuel difficult.

The engine system according to the invention results from the further recognition that the residual gas portion of the charge will vary greatly over various operating conditions of the engine and in particular will increase abruptly when the engine operates under partial load conditions, which will be frequently used when operating an automobile in which the engine system is adapted be installed.

BRIEF DESCRIPTION OF THE DRAWINGS

The invention will hereinafter be described in connection with the accompanying drawings, in which:

FIG. 2 is a top plan view of a valve arrangement of the reciprocal internal combustion engine used in the engine system shown in FIG. 1;

FIG. 3 is a diagrammatic view of the flow control device shown in FIG. 1;

FIGS. 4A and 4B are timing diagrams of signals from the control circuit shown in FIG. 3;

FIG. 5 is a graph showing the required admission of air through the additional intake port bore as a function of the engine speed and induction vacuum;

FIG. 9 is a top plan view of a cylinder head which is applicable to the internal combustion engine which may be used in any one of the preceding embodiments.

DESCRIPTION OF THE PREFERRED EMBODIMENTS

Referring to FIGS. 1–5 the first embodiment of an engine system of the invention will be described hereinafter.

Figure 1:
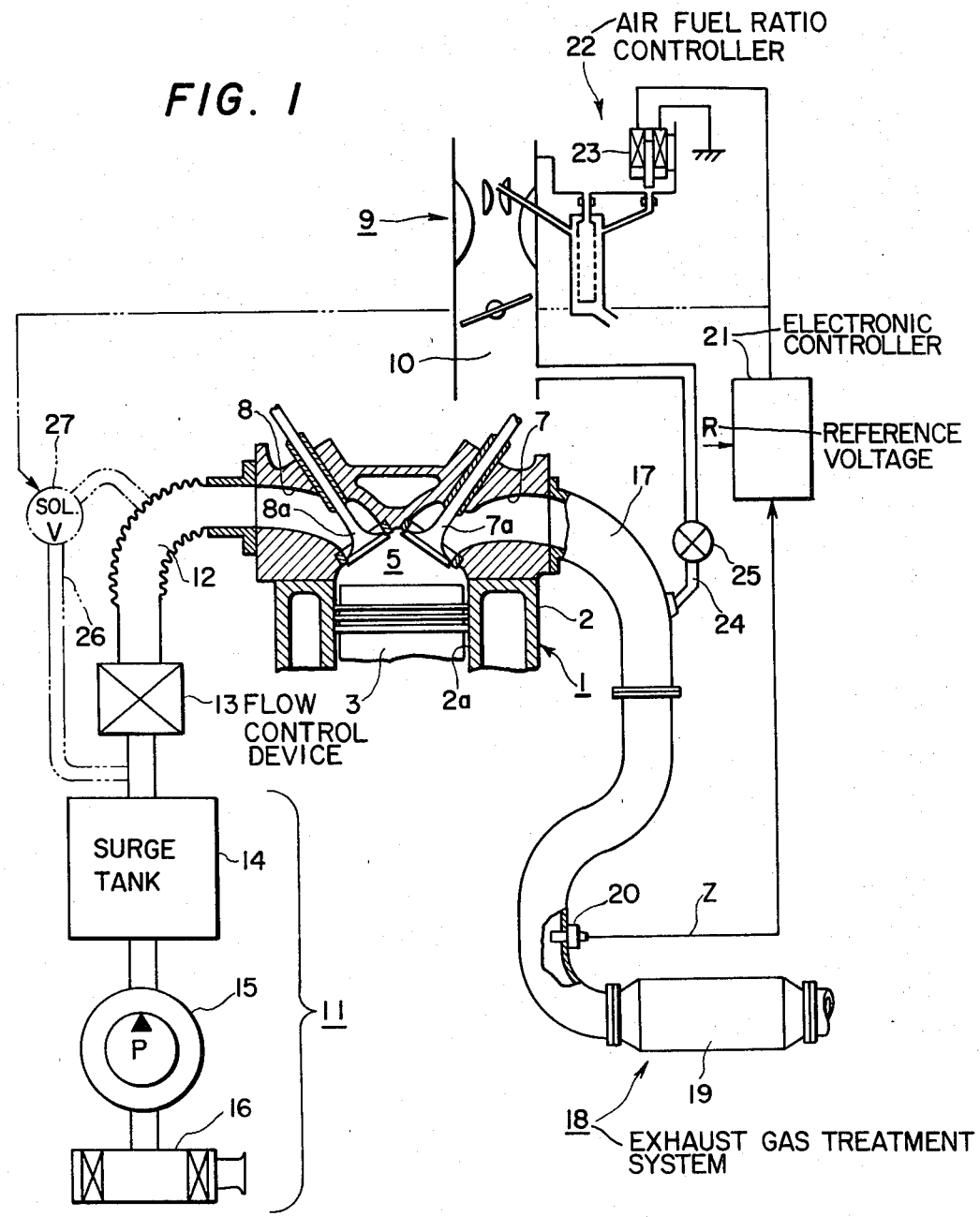
FIG. 1 is a diagrammatic view of a first embodiment of an engine system of the invention.

As shown in FIG. 1, the engine system includes an internal combustion engine 1 which has a cylinder block 2 formed with at least one cylinder 2a, a piston 3 slidable in cylinder 2 for reciprocal movement therein and a cylinder head 4 secured to cylinder block 2 to close cylinder 2a. Cylinder block 2, piston 3 and cylinder head 4 cooperate to form within cylinder 2a a combustion chamber 5. Cylinder head 4 has an intake port bore 6 (see FIG. 2), an exhaust port bore 7 and a second or additional intake port bore 8, all opening to combustion chamber 5. An intake valve 6a cooperating with intake port bore 6, an exhaust valve 7a cooperating with exhaust port bore 7, and a second intake or air inlet valve 8a cooperating with additional intake port bore 8 are supported by cylinder head 4 (see FIGS. 1 and 2). Denoted by the reference numeral 5a in FIG. 2 is an electrode of a spark plug.

An air fuel mixture supplier which is in the form of a carburetor 9 in this embodiment, although other measures may be employed, is connected to intake port bore 7 through an induction conduit 10 so that an air fuel mixture will be admitted by induction to combustion chamber 5 via intake valve 6a during the intake stroke of piston 3. A source of pressurized air 11 is connected to additional intake port bore 8 through an air admission conduit 12 to admit under pressure above atmospheric pressure air to combustion chamber 5 via air inlet valve 8a. In practice air shall be admitted to combustion chamber 5 under pressure ranging from 1.2 kg/cm$^2$ to 2.0 kg/cm$^2$. The flow of air passing through air admission conduit 12 is controllably varied by a flow control device 13 so that, at least, substantially the same amount of air as that of the residual gas or greater than the latter will be admitted to combustion chamber 5 during the exhaust stroke. Source of pressurized air 11 includes a surge tank 14 having an outlet connecting with air admission conduit 12, an air pump 15 and an air cleaner 16. Air pump 15 is connected to an engine crankshaft, not shown in FIG. 1, by a mechanical drive, not shown, to transfer, under pressure above atmospheric pressure, air to surge tank 14. An exhaust conduit 17 connects exhaust port bore 7 to an exhaust gas treatment system 18 to direct engine exhaust gases toward exhaust gas treatment system 18.

Exhaust gas treatment system 18 includes a three-way catalytic converter 19 in this embodiment which is a device of the type in which exhaust gases flowing therethrough are exposed to a catalytic substance which, given the proper air-fuel ratio in the exhaust gases, will promote simultaneous oxidation of CO and HC and reduction of NOx.

Exhaust conduit 17 is provided with an exhaust sensor in the form of an oxygen sensor 20. Oxygen sensor 20 is preferably of the known type which, when exposed to engine exhaust gases at high temperatures, generates an output voltage signal Z which changes appreciably as the air-fuel ratio (A/F) of the exhaust gases passes through the stoichiometric level. Signal Z is fed to an electronic controller 21 where the difference between signal Z and a reference R is obtained. Reference R is chosen to be a constant voltage which is substantially equal to a voltage level of signal Z generated by oxygen sensor 20 when A/F of exhaust gases at a measured point by oxygen sensor 20 is the stoichiometric level. Controller 21 generates a command signal to be supplied to an air-fuel ratio controller 22. Air-fuel ratio controller 22 in this embodiment is of the known type which controls, with a solenoid valve 23, air bled to an air fuel metering system of carburetor 9 so as to reduce the difference between signal Z and reference R. Flow control device 13 will be described in detail referring to FIGS. 3 to 5. Flow control device 13 includes a metering valve 30 fluidly disposed in air admission conduit 12 (see FIG. 3). A vacuum servo 31 is mounted on air admission conduit 12 and has a diaphragm 31a to which the valve stem of metering valve 30 is fixedly connected, an atmospheric chamber 31b below (viewing FIG. 3) diaphragm 31a, a vacuum chamber 31c above (viewing FIG. 3) diaphragm 31a, and a spring 31d mounted within vacuum chamber 31c to act against diaphragm 31a to bias metering valve 30 to the illustrated closed position in which air admission conduit 12 is closed by valve 30. A vacuum conduit 31e connects the outlet of a source of constant vacuum, in the form of a vacuum accumulator 32, to vacuum chamber 31c. Vacuum accumulator 32 is connected to a source of engine induction vacuum, such as induction conduit 10 (see FIG. 1), through a check valve 33. A pressure regulator 34 is mounted on vacuum accumulator 32 to keep the pressure within accumulator 32 constant irrespective of the engine operating conditions. Vacuum conduit 31e is provided with an orifice 35 therein and an air bleed conduit 36 has one end connected to the vacuum conduit 31e at a location intermediate orifice 35 and vacuum chamber 31c. An air bleed orifice 37 is provided within air bleed conduit 36 at an opposite end thereof. A solenoid valve 38 is arranged to control flow through air bleed conduit 36. When not energized, solenoid valve 38 closes air bleed conduit 36, while, when energized, it opens air bleed conduit 36. A control circuit 40, only diagrammatically shown in FIG. 3, is electrically circuited with solenoid valve 38.

The control circuit 40 comprises a clock counter 41 which generates a reset signal 42 at regular intervals. Reset signal 42 is fed to an integrator 43 and also to a flip flop 44 to reset them. An electrical signal 45 representing the engine speed (the engine r.p.m.) is fed to integrator 43. An output signal voltage 46 from integrator 43 rises at a faster rate when the engine speed is high than when the engine speed is low. Output signal voltage 46 is fed to a comparator 47 to which a reference signal voltage 48 representing the engine induction vacuum is fed. Reference signal voltage 48 is higher when the engine induction vacuum is high, i.e., when engine load is low, than when the induction vacuum is low, i.e., when engine load is high. Comparator 47 feeds a reset signal 49 to the flip flop 44 when signal 46 exceeds signal 48. Since the time period after the instance of reset signal 42 to the instance of reset signal 49 is variable in response to the engine speed and induction vacuum, flip flop 44 will generate a pulse signal 50 having a pulse width variable in response to the engine speed and induction vacuum. Pulse signal 50 is amplified by means of a power amplifier 51 and then fed to solenoid valve 38 to energize the solenoid for a time corresponding to the pulse width.

FIG. 4A shows a timing diagram representing the condition that the engine speed is high and induction vacuum is low, while FIG. 4B shows a timing diagram representing the condition that the engine speed is low and induction vacuum is high. FIG. 5 shows a graph plotting the required amount of air for expelling the residual gas from combustion chamber 5 as against the engine speed and induction vacuum. It will now be understood that with metering valve 30 the amount of air to be admitted into combustion chamber 5 through additional intake port bore 8 (see FIG. 1) will be varied as shown in FIG. 5.

Connected to intermediate power amplifier 51 and solenoid valve 38 is a normally closed solenoid switch 52 whose solenoid 52a is circuited with a throttle sensitive switch 53. Throttle sensitive switch 53 is of the known type which is closed when a throttle valve of carburetor 9 is fully opened. Therefore, solenoid 52a is energized to open switch 52 to prevent energization of solenoid valve 38, keeping air bleed conduit 36 closed, applying vacuum in vacuum accumulator 32 to vacuum chamber 31c thereby fully opening metering valve 30.

During the exhaust stroke exhaust valve 7a opens and piston 3 moves upwardly from the bottom dead center, and air inlet valve 8a opens to admit air to combustion chamber 5 for the purpose of expelling the residual gas from combustion chamber 5. Air inlet valve 8a opens fully to permit entry of a great amount of air, enough to expel substantially all of the residual gas from the combustion chamber before exhaust valve 7a closes.

During the intake stroke intake valve 6a opens, exhaust valve 7a closes and piston 4 moves downwardly from the top dead center position. During the initial descent of piston 3, air inlet valve 8a closes. Air fuel mixture having an air fuel (A/F) ratio continuously adjusted by carburetor 9 is admitted by induction to combustion chamber 5.

It will be noted that the residual gas in the charge in combustion chamber 5 becomes negligible and the charge is composed of air admitted to combustion chamber 5, via air inlet valve 8a, during the exhaust stroke to expel the residual gas and of an air fuel mixture admitted to combustion chamber 5, via intake valve 6a, during the intake stroke. This means that the effective cylinder volume is increased by a volume which is equal to the volume of the residual gas expelled from combustion chamber 5 by admission of air via air inlet valve 8a. As a result, power output as well as fuel consumption can be improved.

Referring to the operation of flow control device 13 shown in FIG. 3, during engine operation under idle and deceleration conditions when throttle opening sensitive switch 53 is open, solenoid 52a is not energized so that switch 52 is closed to permit solenoid actuated air bleed control valve 38 to variably open air bleed conduit 36 in response to pulse signal 50 which is a function of engine speed and induction vacuum. It will be noted that under these conditions metering valve 30 controllably varies the amount of air passing through conduit 12 to meet varying demands for a variety of operating conditions. During engine operation under full load or full throttle conditions throttle sensitive switch 53 is closed to energize solenoid 52a thus opening switch 52. Opening switch 52 prevents current from flowing through solenoid actuated control valve 38, closing air bleed conduit 36 thereby to permit vacuum within vacuum accumulator 32 to be transmitted to vacuum chamber 31c causing flow metering valve 30 to fully open conduit 12. Therefore, under full load conditions, an amount of air greater than the amount of residual gas is admitted to combustion chamber 5 during the exhaust stroke before exhaust valve 7a closes permitting a considerable amount of air to flow out of combustion chamber 5 to exhaust conduit 17. This will cause oxygen sensor 20 to generate a level of signal Z which causes air fuel ratio controller 22 to adjust A/F of air fuel mixture supplied to combustion chamber 5 to the richer side than stoichiometry. Enrichment of air fuel mixture supplied to combustion chamber 5 will increase engine power output to meet demands for full load conditions. This will be hereinafter explained in detail.

Characterization of a closed loop control system comprising oxygen sensor 20, electric controller 21 and air fuel ratio controller 22 is such that A/F supplied to combustion chamber 5 is varied to obtain a fixed A/F in the exhaust gases in exhaust conduit 17 upstream of the point measured by oxygen sensor 20. When the amount of air flowing out of combustion chamber 5 into exhaust conduit 17 through exhaust valve 7a during the exhaust stroke is negligible, as is the case when the engine operates under idle, deceleration and partial load conditions, A/F in the exhaust gases represents A/F in the charge in combustion chamber 5 and therefore A/F in the charge is kept around stoichiometry. When a considerably large amount of air flows out of combustion chamber 5 into exhaust conduit 17 together with the exhaust gases, as is the case when the engine operates under full load conditions, there occurs a considerable dilution of engine exhaust gases with the air. Therefore, A/F in the exhaust gases no longer represents A/F in the charge in combustion chamber 5. Since A/F in the charge is adjusted so that exhaust gases resulting from combustion of the charge will have A/F which after dilution with the air will approach stoichiometry at the point measured by the oxygen sensor upstream of the three-way catalytic converter 19, A/F in the charge in combustion chamber 5 under full load engine operating conditions is rich and combustion of such rich charge will result in an increase of engine power output.

It will be noted that although A/F in the charge in combustion chamber 5 is rich under full load engine operating conditions, A/F in exhaust gases upstream of catalytic converter 19 can be kept around levels around which the simultaneous oxidation of CO and HC and reduction of NOx within catalytic converter 19 are maintained.

When it is desired to reduce the NOx level further, exhaust gas recirculation is effected through an exhaust gas recirculation (EGR) conduit 24 leading from exhaust conduit 17 at upstream of oxygen sensor 20 to induction conduit 10 downstream of the carburetor throttle valve. Flow of exhaust gases passing through EGR conduit 24 can be controllably varied in response to engine operating conditions by means of a conventional EGR valve 25. The use of EGR makes possible a substantial cut in the reaction capacity for NOx of three-way catalytic converter 19.

Although in the previously described embodiment a closed loop A/F control system which varies A/F supplied to combustion chamber 5 is employed, it is possible to employ a closed loop air control system which controls, instead of A/F supplied to combustion chamber 5, the amount of air admitted to combustion chamber 5 via air inlet valve 8a. When the closed loop air control system is employed, carburetor 9 is set rich and A/F in the charge is adjusted around stoichiometry after dilution of air admitted to combustion chamber 5 via air inlet valve 8a. Closed loop air control may be effected with a bypass conduit 26 having one end connected to conduit 12 upstream of flow metering valve 30 of flow control device 13 and the opposite end connected to conduit 12 downstream of flow metering valve 30 thereof (see FIGS. 1 and 3). Bypass conduit 26 is provided with a solenoid actuated flow control valve 27 circuited to receive a command signal from electronic controller 21. Characterization of closed loop air control system is such that the amount of additional air supplied through bypass conduit 26 is increased by valve 27 when A/F in the exhaust gases in exhaust conduit 17 upstream of oxygen sensor 20 is richer than stoichiometry, while it is decreased by valve 27 when the A/F is leaner than stoichiometry. In order to adjust A/F in the charge to stoichiometry, the amount of air admitted to combustion chamber 5 via air inlet valve 8a is controlled mainly by means of flow control device 13 to meet demands for scavenging combustion chamber 5 and additionally by means of control valve 27 for diluting air fuel mixture admitted to combustion chamber 5 when the engine operates under idle, deceleration and partial load conditions. When high engine power output is required, control valve 27 is closed to prevent flow of air through bypass conduit 26 such as by isolating the valve 27 from the demanded signal from electric controller 21 to enrich A/F in the charge in combustion chamber 5.

In the case that the closed loop air control system is employed, switch 52 (see FIG. 3) is kept closed.

It will be appreciated from the previous description that in an engine system according to the invention the charge in combustion chamber 5 is conditioned favorably for satisfactory combustion.

It will also be appreciated that emission levels from an engine system according to the invention are low.

It will also be appreciated that, when required, an engine system according to the invention can yield high power.

Figure 6:
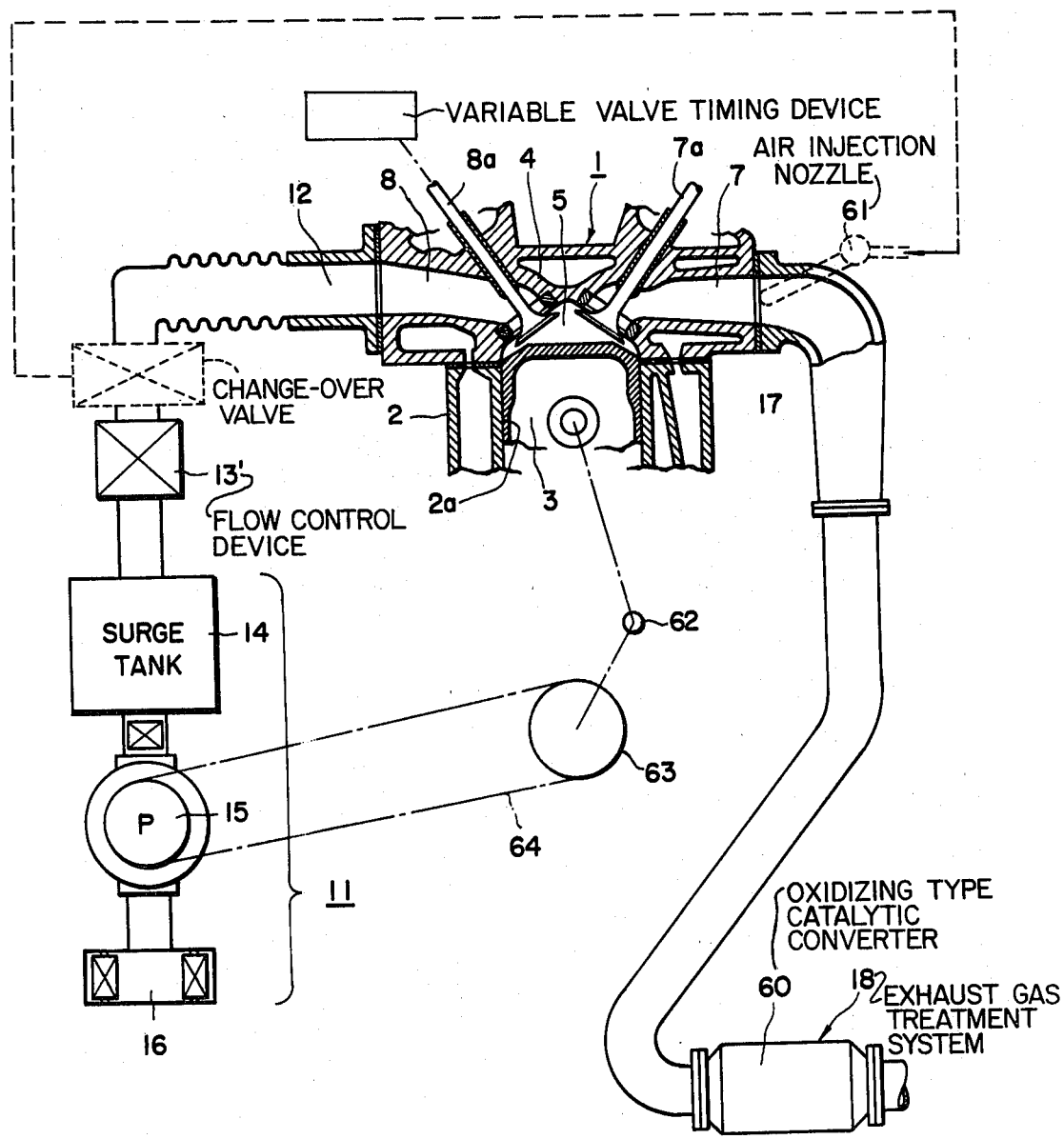
FIG. 6 is a similar view to FIG. 1 showing a second embodiment of an engine system of the invention.

Referring to the second embodiment of an engine system shown in FIG. 6, this embodiment differs from the previously described first embodiment in that:

Although the exhaust gas treatment system 18 takes the form of three-way catalytic converter 19 and a closed loop control system including oxygen sensor 20, control circuit 21 and an air fuel ratio control actuator 22 is used in the first embodiment, exhaust gas treatment system 18 takes the form of an oxidation catalytic converter 60 in this embodiment so that such a closed loop control system as used in the first embodiment is unnecessary and is eliminated. Oxidation catalytic converter 60 is a device in which exhaust gases flowing therethrough are exposed to a catalytic substance which will promote oxidation of CO and HC.

Explaining the FIG. 6 embodiment in more detail, the air fuel ratio of the mixture admitted to combustion chamber 5 is variably adjusted by a carburetor, not shown. Setting of the carburetor is made and/or the opening timing of air inlet valve 8a is set so that air fuel ratio of the charge, which is composed of air fuel mixture admitted to combustion chamber 5 via intake valve 6a (see FIG. 2) and air admitted to combustion chamber 5 via air inlet valve 8a, becomes lean to bring about a lean combustion which results in exhaust gases that are suitable for oxidation within oxidation catalytic converter 60. It will be noted that A/F in the charge becomes leaner than that in the air fuel mixture admitted to combustion chamber 5 via intake valve 6a because the mixture is diluted by air admitted to combustion chamber 5 via air inlet valve 8a.

Delaying the opening timing of air inlet valve 8a by means of a suitable variable value timing device will increase the valve opening duration after exhaust valve 7a has closed, resulting in an increase in the proportion of air from air inlet valve 8a to the charge in combustion chamber 5. Thus it will be noted that dilution of fresh mixture from intake valve 6a can, if desired, be brought about by increasing the valve opening duration.

A/F in air-fuel mixture admitted to combustion chamber 5 via intake valve 6a (see FIG. 2) shall be determined taking the following factors into account. Stable combustion will be hampered although the oxygen content resulting from such combustion increases when the charge in combustion chamber 5 becomes excessively lean. Oxygen content in the exhaust gases decreases although stable combustion is insured when the charge in combustion chamber approaches stoichiometry from the lean side.

In order to bring about a stable lean combustion, the charge in combustion chamber 5 is swirled by a jet of air admitted to combustion chamber via air inlet valve 8a to make better mixing of fuel with air. As shown in FIG. 2 air inlet valve 8a is formed with a valve shroud 8b to cause air to swirl around the cylinder axis although other arrangement or construction including complicated port configuration can be employed.

The engine exhaust gases are directed by exhaust conduit 17 toward oxidation catalytic converter 60 where oxidation of HC and CO in the exhaust gases takes place and then they are discharged to the ambient atmosphere.

Due to the elimination of the residual gas and stable combustion of lean mixture, HC and CO levels in the exhaust gases are low lightening the burden on oxidation catalytic converter 60 and the amount of oxygen in the exhaust gases is sufficient for oxidation of HC and CO in the converter 60. Thus a secondary air supply system is simplified or unnecessary.

When, for yielding high power output, the setting of carburetor is made rich so that A/F in the charge for power output is brought about, air to be admitted to combustion chamber 5 via air inlet valve 8a may be discharged to exhaust conduit 17 via a change-over valve, shown in dashed lines which communicates with a nozzle 61 shown in dashed lines in FIG. 6 or the amount of air admitted after exhaust valve 7a closes may be reduced while increasing the amount of air admitted during the exhaust stroke such as by advancing the closing timing of air inlet valve 8a under this engine operating condition.

In operation air having been filtered by air cleaner 16 is supplied to surge tank 14 and accumulated therein at a certain pressure above atmospheric pressure by means of air pump 15 which is driven by the engine crankshaft 62 through a pulley 63 and a belt 64.

The pressure at which air is accumulated in surge tank 14 may be increased with the engine revolution speed, if desired.

Air accumulated at constant pressure in surge tank 14 is admitted to combustion chamber 5 via air inlet valve 8a. Flow of air is controlled in response to induction vacuum and engine speed by means of a flow control device 13' which is substantially similar to that illustrated in FIG. 3 except that switch 52 is eliminated.

Air inlet valve 8a is kept open from the final portion of the exhaust stroke to the initial portion of the subsequent intake stroke to admit under pressure air to combustion chamber 5 to expel the residual gas out of combustion chamber 5 before exhaust valve 7a closes.

As a result, because the amount of residual gas contained in the charge is negligible and the charge generally consists of fresh air fuel mixture from intake valve 6a and air having replaced the residual gas, stable combustion will take place even if A/F in the charge is very lean. It will also be noted that effective cylinder volume increases by a volume corresponding to the volume of residual gas expelled out of combustion chamber 5 causing an increase of engine power output.

The amount of air admitted to combustion chamber 5 per each opening duration of air inlet valve 8a shall be controlled so that A/F in the charge in combustion chamber 5 is kept lean.

It will be noted from the previous description of the embodiment illustrated in FIG. 6 that due to such a lean combustion as previously described, HC and CO in the exhaust gases will be sufficiently oxidized in oxidation catalytic converter 60 without secondary air supply to exhaust conduit 17 which, if employed, might lower the exhaust temperature slowing the oxidation reaction speed in converter 60.

It will also be noted that with varying the excess amount of air admitted to combustion chamber 5 during the exhaust stroke, it is possible to adjust A/F in the exhaust gases to the desired level that is suitable for treatment in catalytic converter 60.

Figure 7:
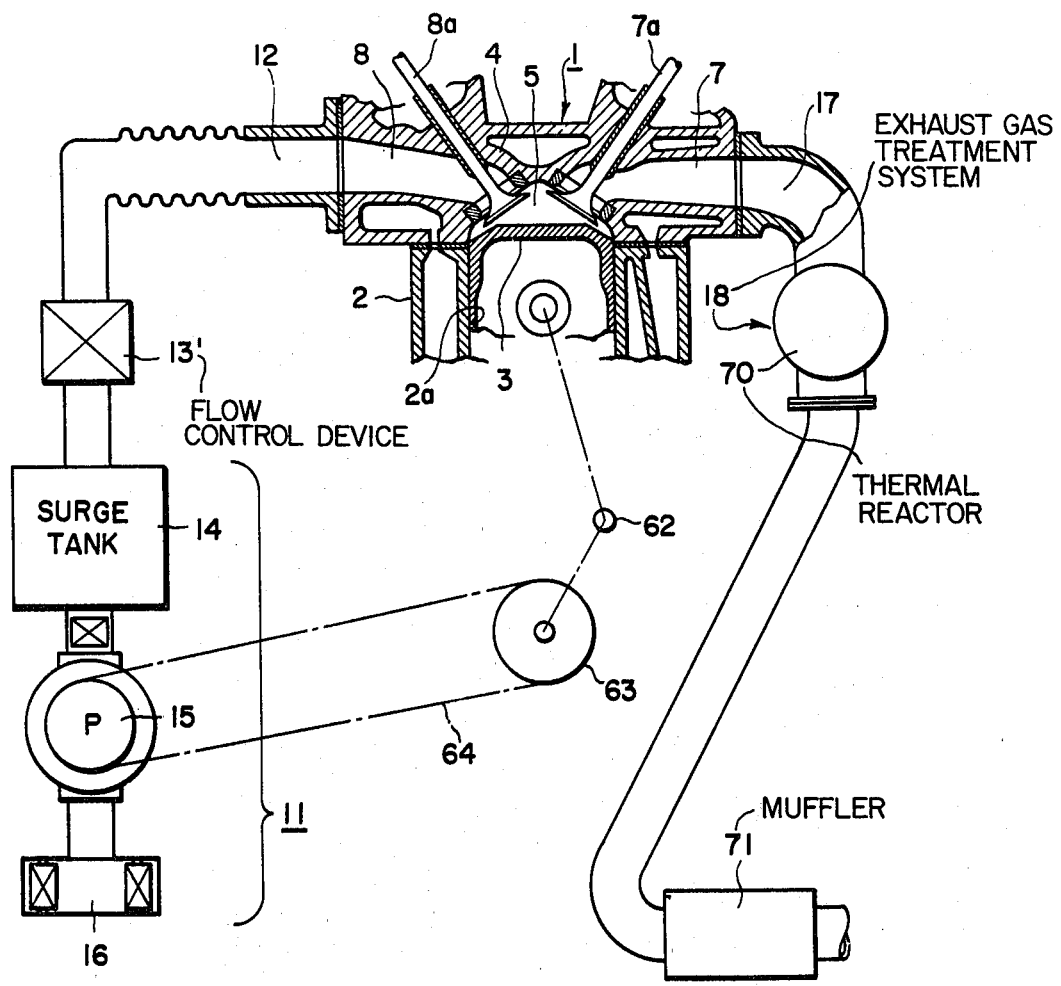
FIG. 7 is a similar view to FIG. 6 showing a third embodiment of an engine system of the invention.

The third embodiment shown in FIG. 7 differs from the second embodiment in that exhaust treatment system 18 includes a thermal reactor 70 instead of oxidation catalytic converter 60. Denoted by the reference numeral 71 in this Figure is a muffler.

Figure 8:
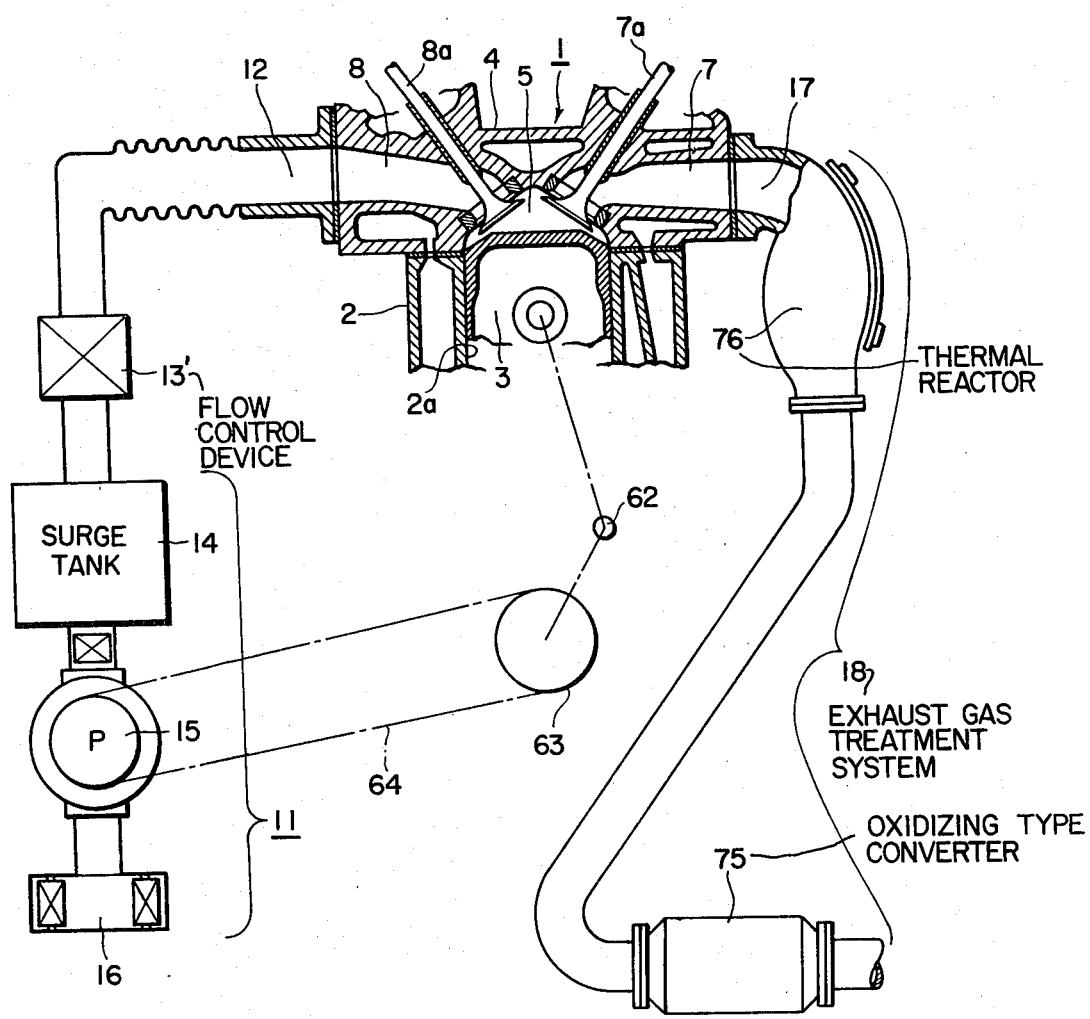
FIG. 8 is a similar view to FIG. 6 showing a fourth embodiment of an engine system of the invention.

The fourth embodiment shown in FIG. 8 differs from the third embodiment in that treatment system 18 includes an oxidation catalytic converter 75 mounted in the exhaust system downstream of a thermal reactor 76. In this case since the remaining HC and CO not oxidized in thermal reactor 76 will be oxidized by oxidation converter 75, the oxidation capacities of thermal reactor 76 and oxidation converter 75 are small and they can be made of compact size.

Although not shown in FIGS. 6–8, NOx reduction may be effected by arranging an EGR conduit and an EGR flow control valve as shown in FIG. 1, if desired.

FIG. 9 shows a preferred cylinder head construction applicable to any one of the previously described embodiments. For the purpose of keeping the exhaust gases high enough for sufficient treatment in exhaust gas treatment system 18, each two adjacent exhaust port bores are joined to form a so-called Siamesed exhaust port 80 and a port liner 81 is mounted in each Siamesed exhaust port 80. Denoted by the reference numeral 82 is an intake manifold.

What is claimed is:

1. An internal combustion engine system including an internal combustion engine having a cylinder and a piston disposed in said cylinder to define a variable volume combustion chamber, comprising:
   an intake means for inducting an air fuel mixture having an air-fuel ratio into said combustion chamber during an induction stroke of said piston;
   an exhaust means for exhausting the exhaust gas resulting from the combustion of said air fuel mixture from said combustion chamber during an exhaust stroke of said piston;
   an additional intake means, including a conduit means, for admitting air under pressure into said cylinder during a first phase which overlaps the exhaust stroke of said piston, so as to scavenge combustion products from said combustion chamber and for admitting air under pressure into said cylinder during a second phase which overlaps the intake stroke of said piston;
   an exhaust gas purifying device in said exhaust means for purifying the gases from said combustion chamber; and
   control means including a flow control valve disposed in said conduit means, said valve being responsive to signals representing engine speed and engine induction vacuum to decrease the amount of air admitted to said combustion chamber with increasing engine speed and decreasing induction vacuum;
   said control means further including means for proportioning the amount of air admitted to said combustion chamber during said first phase and during said second phase so that as the load on the engine increases the amount of air admitted during said first phase increases and the amount of air admitted during said second phase is decreased whereby said control means continuously controls the amount of air admitted to said combustion chamber during said first phase and during said second phase so that as the load on said engine increases the air fuel mixture combusted in said combustion chamber becomes richer.

2. An internal combustion engine system including an internal combustion engine having a cylinder and a piston disposed in said cylinder to define a variable volume combustion chamber, comprising:
   an intake means for inducting an air fuel mixture having an air-fuel ratio into said combustion chamber during an induction stroke of said piston;
   an exhaust means for exhausting the exhaust gas resulting from the combustion of said air fuel mixture from said combustion chamber during an exhaust stroke of said piston;
   an additional intake means, including a conduit means, for admitting air under pressure into said cylinder during a first phase which overlaps the exhaust stroke of said piston, so as to scavenge combustion products from said combustion chamber and for admitting air under pressure into said cylinder during a second phase which overlaps the intake stroke of said piston;
   an exhaust gas purifying device in said exhaust means for purifying the gases from said combustion chamber; and
   control means including a flow control valve disposed in said conduit means, said valve being responsive to signals representing engine speed and engine induction vacuum to decrease the amount of air admitted to said combustion chamber with increasing engine speed and decreasing induction vacuum;
   said control means further including means for by-passing said air under pressure normally fed via said flow control valve to said combustion chamber around said combustion chamber and admitting air under pressure into said exhaust means upstream of said purifying device when engine load exceeds a predetermined level whereby said control means continuously controls the amount of air admitted to said combustion chamber during said first phase and during said second phase so that as the load on the engine increases the air fuel mixture combusted in said combustion chamber becomes richer.

3. An internal combustion engine system including an internal combustion engine having a cylinder and a piston disposed in said cylinder to define a variable volume combustion chamber, comprising:
   an intake means for inducting an air fuel mixture having an air-fuel ratio into said combustion chamber during an induction stroke of said piston;
   an exhaust means for exhausting the exhaust gas resulting from the combustion of said air fuel mixture from said combustion chamber during an exhaust stroke of said piston;
   an additional intake means for admitting air under pressure into said cylinder during a first phase which overlaps the exhaust stroke of said piston, so as to scavenge combustion products from said combustion chamber and for admitting air under pressure into said cylinder during a second phase which overlaps the intake stroke of said piston;
   an exhaust gas purifying device in said exhaust means for purifying the gases from said combustion chamber; and
   control means for reducing the air-fuel ratio of the air fuel mixture combusted in said combustion chamber with increasing load and further for controlling the amount of air which mixes with the combustion products upstream of said purifying device to thereby control the air-fuel ratio of the exhaust gases entering said exhaust gas purifying device within a range suited for purification therein, said control means continuously controlling the amount of air admitted to said combustion chamber during said first phase and during said second phase.

4. A combination as claimed in claim 3, wherein said additional intake means includes:
   a source of pressurized air;
   a valve controlled intake port opening into said combustion chamber; and
   conduit means for providing fluid communication between said source of pressurized air and said valve-controlled intake port bore.

5. A combination as claimed in claim 4, wherein said control means includes a flow control valve disposed in said conduit means and which is responsive to signals representing engine speed and engine induction vacuum so that with increasing engine speed and decreasing induction vacuum the amount of air admitted to said combustion chamber is decreased.

6. A combination as claimed in claim 5 wherein said control means further includes means for proportioning the amount of air admitted to said combustion chamber during said first phase and during said second phase so that as the load on the engine increases the amount of air admitted during said first phase increases and the amount of air admitted during said second phase is decreased.

7. A combination as claimed in claim 5 wherein said control means further includes means for by-passing the air under pressure normally fed via said flow control valve to said combustion chamber around said combustion chamber and admitting said air under pressure into said exhaust means upstream of said exhaust gas purifying device when the load on said engine exceeds a predetermined level.

8. In an internal combustion engine,
means for defining cylinder;
a piston reciprocatively disposed in said cylinder to define a single discrete variable volume combustion chamber in said cylinder;
an exhaust system including:
an exhaust conduit leading from said combustion chamber to the ambient atmosphere,
an exhaust valve disposed in said exhaust conduit for controlling the fluid communication between said exhaust conduit and said combustion chamber, said exhaust valve being opened and closed in a timed relationship with respect to the exhaust stroke of said piston for exhausting exhaust gases from said combustion chamber;
an induction system including:
means for forming an air-fuel mixture,
an induction conduit leading to the combustion chamber for delivering the air-fuel mixture formed by said air-fuel forming means to said combustion chamber,
a first inlet valve disposed in said induction conduit for controlling the fluid communication between said induction conduit and said combustion chamber, said first inlet valve being opened and closed in a timed relationship with respect to the induction stroke of said piston for controlling induction of said air-fuel mixture into said combustion chamber;
a pressurized air induction system including:
a pump driven by said engine for compressing air
a surge tank fluidly communicating with said pump for storing compressed air from said pump,
a pressurized air conduit leading from said surge tank to said combustion chamber,
a second inlet valve disposed in said cylinder defining means for controlling the fluid communication between said surge tank and said combustion chamber, and
a flow control valve unit disposed in said pressurized air conduit between said surge tank and said second inlet valve for controlling the amount of air permitted to flow from said surge tank to said combustion chamber, said flow control valve unit being responsive to signals representative of engine induction vacuum and engine speed and being operative to decrease the amount of air permitted to said combustion chamber with decreasing induction vacuum and increasing engine speed;
means for opening said second inlet valve during the final stage of said exhaust stroke for admitting compressed air into said combustion chamber to scavenge exhaust gases which would otherwise tend to remain in said combustion chamber after said exhaust stroke, and for opening said second inlet valve during a portion of said induction stroke for admitting compressed air into said combustion chamber so that said compressed air mixes with the air fuel mixture supplied into said combustion chamber via said first inlet valve to form a substantially uniform combustible charge; and
an exhaust gas purifying device disposed in said exhaust conduit for receiving said exhaust gases from said combustion chamber and for lowering the amount of noxious components contained in said exhaust gases.

9. An internal combustion engine as claimed in claim 8, wherein said air-fuel forming means includes:
an electronically controlled carburetor,
an oxygen sensor disposed in said exhaust conduit for sensing the concentration of oxygen in the gases flowing through said exhaust conduit and producing a signal indicative of the sensed concentration,
a control device electrically connected to said oxygen sensor for comparing the signal from said sensor with a reference signal and producing a command signal for controlling said carburetor such that said carburetor produces a rich air-fuel mixture which is diluted by said compressed air used for scavenging during the final stage of said exhaust stroke so that a substantially stoichiometric air-fuel mixture enters said exhaust gas purifying device,
a compressed air by-pass conduit leading from said compressed air conduit at a location upstream of said flow control valve unit to said pressurized air conduit at a location downstream of said flow control valve unit for by-passing said flow control valve unit, and
a valve disposed in said by-pass conduit and responsive to an output of said control device for controllably permitting an amount of air to flow to said combustion chamber from said surge tank via said by-pass conduit in addition to the amount of air flow controlled by said flow control valve unit, thereby effecting finer control of air-fuel mixture entering said exhaust gas purifying device.

10. An internal combustion engine as claimed in claim 8, wherein said second inlet valve opening means shifts the opening timing of said second inlet valve such that, during light load operation of said engine, said second inlet valve remains open after said exhaust valve has closed so that some of said compressed air used for scavenging dilutes the fresh charge of air fuel mixture entering said combustion chamber via said first inlet valve to lean said mixture prior to ignition of said mixture and, during high load operation said engine, said second inlet valve is closed earlier than with light engine load operation thereby reducing or stopping said dilution and thus increasing the amount of air used for scavenging, whereby a relatively rich air-fuel mixture is combusted in said combustion chamber for increasing power output of said engine during high engine load operation and whereby the exhaust gases contain sufficient oxygen, provided by said compressed air used for scavenging, for reaction in said exhaust gas purifying device.

11. An internal combustion engine as claimed in claim 8, wherein said pressurized air conduit and said second inlet valve cooperate to introduce said compressed air into said combustion chamber in a direction substantially tangential with respect to a wall of said cylinder so that the compressed air swirls in said combustion chamber in a single rotational direction.

12. An internal combustion engine as claimed in claim 8, further comprising means for imparting a swirling force to the compressed air admitted to said combustion chamber via said second inlet valve so that said compressed air swirls in a single rotational direction in said combustion chamber to induce the remaining charge in said combustion to mix and swirl in said rotational direction.

13. An internal combustion engine as claimed in claim 8, further comprising means for recirculating exhaust gases from said exhaust conduit to said induction conduit, whereby said exhaust gas recirculation means in combination with the scavenging provided via said second inlet valve enables accurate metering of the amount of exhaust gas in the combustion chamber and a reduction of vacuum prevailing in the induction conduit.

14. An internal combustion engine as claimed in claim 8, further comprising an air injection nozzle opening into said exhaust conduit and means for by-passing at least a part of the air fed to said second inlet valve from said surge tank via said flow control valve unit through said air injection nozzle into said exhaust conduit during full load operation of said engine.

15. A method of operating an internal combustion engine having an exhaust gas purification device, comprising the steps of:
    forming an air-fuel mixture with an air-fuel forming device;
    feeding said air-fuel mixture to a combustion chamber of said engine via an induction system having a first inlet valve;
    compressing air by means of a pump driven by said engine;
    storing said compressed air in a surge tank;
    opening a second inlet valve during the final stage of said exhaust stroke for admitting compressed air into said combustion chamber to scavenge exhaust gases which would otherwise tend to remain in said combustion chamber;
    opening said second inlet valve during a portion of said induction stroke for admitting compressed air into said combustion chamber so that said compressed air mixes with the air fuel mixture supplied into said combustion chamber via said first inlet valve to form a substantially uniform combustible charge;
    maintaining said second inlet valve open for a time after said exhaust valve has closed for injecting air into said combustion chamber to dilute and lean said air-fuel mixture;
    controlling the flow of air between said surge tank and said second inlet valve by means of a flow control valve unit;
    reducing said flow of air in response to increasing engine speed and decreasing induction vacuum prevailing in said induction system;
    exhausting exhaust gases from said combustion chamber via an exhaust valve; and
    reacting said exhaust gases in said exhaust gas purifying device.

16. A method of operating an internal combustion engine as set forth in claim 15, wherein said exhaust gas purification device is a three-way catalytic converter and said air-fuel forming device is an electronically controlled carburetor, further comprising the steps of:
    sensing the oxygen content of the exhaust gases upstream of said three-way catalytic converter;
    producing a signal indicative of the sensed oxygen content;
    controlling said air-fuel mixture by means of said electronically controlled carburetor in dependence on said signal; and
    when high power output of said engine is required, injecting an excessive amount of air into said combustion chamber, thereby causing said oxygen sensor to be exposed to and thus sense an air-fuel mixture having an air-fuel ratio higher than stoichiometric, which in turn causes said electronically controlled carburetor to produce a rich air-fuel mixture which combusts in said combustion chamber prior to dilution by said excessive amount of air whereupon exhaust gases having an air-fuel ratio very close to stoichiometry are formed.

17. A method of operating an internal combustion engine as set forth in claim 15, further comprising the step of:
    by-passing all of the air fed from said surge tank to said second inlet valve under high load operation of said engine so that said air fuel mixture is combusted undiluted in said combustion chamber, and injecting said by-passed air into said exhaust gases downstream of said combustion chamber, prior to entry into said exhaust gas purifying device, via an air injection nozzle, thereby providing for adequate oxidation of said exhaust gases in said purifying device.

18. A method of operating an internal combustion engine as set forth in claim 15, further comprising the step of:
    recirculating a portion of exhaust gases exhausted from said combustion chamber via an exhaust gas recirculation system in order to reduce formation of $NO_x$ in said combustion chamber and reduce induction vacuum prevailing in said induction system upstream of said first inlet valve, thereby reducing pumping loss at part throttle operation of the engine,
    said step of scavenging and said step of recirculating cooperating to enable precise metering of the amount of exhaust gas contained in said combustion chamber at the moment of ignition of the charge therein.

19. A method of operating an internal combustion engine as set forth in claim 15, further comprising the step of directing said compressed air into said combustion chamber so as to cause said compressed air to swirl in a single rotational direction within said combustion chamber.

20. A method of operating an internal combustion engine as set forth in claim 15, wherein:
    said step of maintaining and said step of reducing the flow of air to the combustion chamber in response to increasing engine speed and decreasing induction vacuum cooperating to cause enrichment of the air-fuel mixture combusted in the combustion chamber as the mode of operation of said engine shifts from light load to high load.

21. A method of operating an internal combustion engine as set forth in claim 20, further comprising the step of:

varying the valve timing of said second inlet valve so as to vary the amount of air injected for diluting the air fuel mixture with respect to the amount of air injected for scavenging said combustion chamber so that, as the mode of engine operation shifts from light load operation to high load operation, the amount of air used for diluting the air-fuel mixture is decreased while the amount of air used for scavenging is increased, thereby causing enrichment of the air-fuel mixture ignited during said shift from light load operation to high load operation, whereby the power output of said engine is increased and sufficient oxygen in added via said scavenging for oxidizing exhaust gases in said exhaust gas purifying device.

* * * * *